United States Patent [19]
Koert et al.

[11] Patent Number: 5,416,486
[45] Date of Patent: May 16, 1995

[54] IDENTIFICATION/SECURITY TAG SYSTEM EMPLOYING ELECTRONIC DOPPLER SHIFTING AND/OR RECTENNA STRUCTURE

[75] Inventors: Peter Koert, Washington, D.C.; George M. Metze, Gaithersburg, Md.; Mark Machina, Alexandria, Va.

[73] Assignee: APTI, Inc., Del.

[21] Appl. No.: 148,433

[22] Filed: Nov. 8, 1993

[51] Int. Cl.⁶ .................................................. G01S 13/74
[52] U.S. Cl. ........................................ 342/42; 342/43; 342/51
[58] Field of Search ............................... 342/42, 43, 51

[56] References Cited

U.S. PATENT DOCUMENTS

| | | | |
|---|---|---|---|
| 4,015,259 | 3/1977 | Siverhus et al. | 342/51 |
| 4,170,773 | 10/1979 | Fitzsimmons et al. | 342/42 |
| 4,260,983 | 4/1981 | Falck et al. | 342/42 |
| 4,331,957 | 5/1982 | Enander et al. | 342/42 |
| 4,647,930 | 3/1987 | Carof et al. | 342/51 X |
| 4,804,961 | 2/1989 | Hane | 342/42 X |
| 5,068,669 | 11/1991 | Koert et al. | 343/700 MS |
| 5,218,374 | 6/1993 | Koert et al. | 343/789 |

*Primary Examiner*—Mark Hellner
*Attorney, Agent, or Firm*—Parkhurst, Wendel & Rossi

[57] ABSTRACT

An identification/security tag system, including miniaturized tags which can be readily concealed, utilizes a concept of "electronic" Doppler shifting to generate a frequency shifted signal in response to an interrogation signal. The frequency shifted signal is used to identify individual tags. The implementation of electronic Doppler shifting permits the utilization of conventional police/sport radar guns as a combined transmitter and receiver unit, thereby greatly reducing the expense of the system. The high frequency operation of the system permits size of the tag to be significantly reduced with respect to the size of tags used in conventional tag systems. Rectenna circuitry is further employed to eliminate the need for an active power supply in the tag in some applications.

14 Claims, 4 Drawing Sheets

IDENTIFICATION/SECURITY TAG SYSTEM EMPLOYING ELECTRONIC DOPPLER SHIFTING AND/OR RECTENNA STRUCTURE

FIELD OF THE INVENTION

The invention relates in general to identification/security tag systems that utilize electromagnetic energy to detect the presence of a tag. More specifically, the invention relates to an identification/security tag system that incorporates frequency shifting to uniquely identify a tag.

BACKGROUND OF THE INVENTION

Tagging systems have been used for several years in identification and security applications. Conventional tagging systems generally include three basic components: a base transmitter; one or more identification tags; and a base receiver. The transmitter is used to generate and transmit an interrogation signal within an operating or interrogation zone. The identification tags, when present within the interrogation zone, respond to the interrogation signal by transmitting an identification signal. The identification signal transmitted from the tag is detected by the receiver and decoded to uniquely determine the identity of the tag.

While a number of applications that utilize tagging systems have emerged in the commercial market in recent years, conventional tagging systems employed in these applications have generally operated at low frequencies and utilize tags having dimensions equivalent to the size of a credit card or larger. In many applications, for example surveillance monitoring, the size of conventional tags present a disadvantage, as it is difficult to conceal the tags to prevent the detection of their presence. Conventional tag systems, with operating distances/zones of more than 12-18 inches, also utilize tags that require an active power source, such as a battery, which poses an additional disadvantage in security monitoring applications where the maintenance or replacement of the power source may present a problem.

In view of the above, it is an object of the invention to provide an identification/security tag system that utilizes miniaturized tags which can be readily concealed. It is a further object of the invention to provide an identification/security tag system that can be inexpensively implemented, and which preferably employs "passive" tags, that do not require a power source, or "semi-passive" tags, which do contain a power source, but that do not drain a substantial amount of power until an interrogation signal is detected.

SUMMARY OF THE INVENTION

The invention provides an identification/security tag system that utilizes miniaturized tags which can be readily concealed. The tags generate an information signal in response to a microwave interrogation signal. Operation in the microwave region permits the diameter of the tags to be reduced to less than 5 mm. The system also utilizes the concept of "electronic" Doppler shifting to generate a frequency shifted signal information signal in response to the microwave interrogation signal. The implementation of electronic Doppler shifting permits the utilization of conventional police/sport radar guns as a combined transmitter and receiver unit, thereby greatly reducing the expense of the system. Rectenna circuitry is further employed to eliminate the need for an active power supply in some applications.

BRIEF DESCRIPTION OF THE DRAWINGS

The following figures will be referenced in discussing the details of the preferred embodiments of the invention, wherein.

DETAILED DESCRIPTION OF THE PREFERRED EMBODIMENTS

The invention is based, in part, on the recognition that a system operating at higher frequencies, than those currently utilized in conventional tag systems, would permit a significant reduction in the size of a receiving/transmitting antenna included within a tag, while maintaining a reasonable antenna gain/sensitivity. For example, if two tag systems are available, with both systems having the same transmitting power and utilizing tags restricted to the size a quarter, and the first system operates at 100 MHz while the second system operates at 35 GHz, the tag in the second system will have greater gain/sensitivity (range) than the tag in the first (lower frequency) system. In short, at high frequencies (or at millimeter wavelengths), the size of the tag antenna can be made approximately equal to half a wavelength of the transmitted signal and represents a resonant structure, however, at lower frequencies (longer wavelengths) the tag antenna is no longer resonant and therefore has little gain.

Antenna structures that can be incorporated into a high frequency tag system as described above are disclosed in U.S. Pat. Nos. 5,068,669 and 5,218,374, the contents of which are herein incorporated by reference. These patents describe power beaming systems in which a high frequency beam is directed to an array of rectifying antenna structures that convert energy received from the beam into direct current, which is subsequently used to power various devices. The technology utilized in the power beaming systems can be adapted to provide a high frequency tag system having miniaturized tags that do not require an active power source.

While the aforementioned patents illustrate the feasibility of designing and fabricating tags that will work up to 100 GHz, overall system cost for most applications becomes prohibitively expensive as one moves to higher frequencies. A tag system functioning at known police/sport-band frequencies (i.e., X-band, $K_u$ and $K_a$/-Band), however, has several advantages including the ready supply of inexpensive transmitters/receivers (i.e., police/sport radar guns) that are currently mass produced. Additionally, since there is no commercial activity at these frequencies (at present), a system designed to operate at 35 GHz (for example) is less likely to experience interference from other sources of microwave energy.

Figure 1:
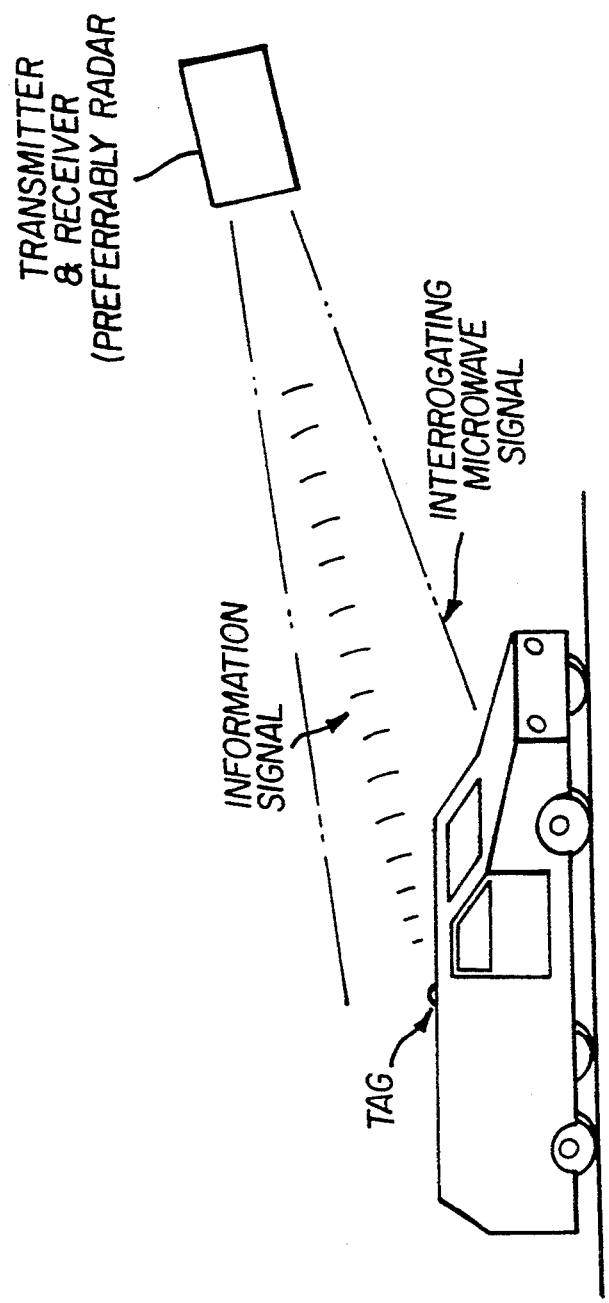
FIG. 1 is a conceptional drawing depicting the use of a tag to identify a vehicle.

FIG. 1 illustrates the concept of utilizing a tag system to identify a vehicle. The diameter of the illustrated circular tag is about 5 mm or less, which enables the tag to be affixed to the vehicle at almost any location, including those areas easily hidden from view. An interrogating microwave signal is then transmitted in the direction of the passing vehicle. Once the tag detects the incident signal, it responds with an information signal that uniquely identifies the tag.

The use of the above-described power beaming rectifying antenna structures (rectennas) enables the tag to be passive, i.e. without an internal power source. However, for systems operating with low transmitting power, such as a police/sport radar gun, the maximum range of the system would be limited to about five meters. While a five meter range may be sufficient for some applications, for example to identify vehicles passing through a toll-gate, it would be desirable to provide a system having a greater range for surveillance applications. Thus, the tag may also be an active tag, which incorporates an internal power source or battery, or a semi-passive tag, which includes an internal power source that is only drained when the interrogation signal is received, to boost operating range up to 100 meters.

In either a passive, active or semi-passive tag system, a method of uniquely identifying the tag must be provided. A number of ways have been proposed and adopted to encode/decode a unique identifying signature (or serial number) associated with a particular tag. Heretofore, all tagging systems have used standard digital circuitry, or read/write memory, to encode/decode a unique number/name associated with each tag. Such circuitry can be readily applied to a high frequency tag of the type discussed above. The use of such circuitry, however, increases the complexity and expense of the system. In particular, more elaborate and expensive transmitters and receivers must be utilized.

The invention is therefore further based, in part, on the recognition that a Doppler frequency shift can be employed to inexpensively identify a tag. The standard police/sport radar guns, which can be employed as both the transmitter and receiver, operates on the principle of looking at the Doppler-shifted microwave signal reflected back from an object in motion. Similar to the change in pitch (frequency) that a speeding train makes as it moves towards or away from an observer, a microwave signal from a police/sport radar gun that is reflected back from a moving object (such as a car), will have its frequency slightly shifted from the incident signal. This shift in frequency is directly related to the speed of the object, and once detected by the radar gun, is displayed on its digital readout as velocity. Based on the above, a tag can be provided with a unique "velocity" signature or identification code, by incorporating simply circuitry into the tag that will simulate a moving object by causing a fixed Doppler frequency shift in a received interrogation signal. Thus, the tag transmits a Doppler shifted signal, in response to the interrogation signal, that can be identified by using the radar gun as a base receiver to decode the Doppler shifted signal.

More specifically, each tag to be utilized in the system is programmed to have a unique frequency-shifted signal or "speed". The "programming" of the speed (frequency shift) can be readily accomplished by simply changing capacitor and/or resistor values within the circuitry, much in the same that garage door openers haver different frequencies determined (set) be variable resistors. The frequency-shifted signal from the tag is then re-transmitted back to the radar gun. The detected signal is subsequently processed by the radar gun, and the "speed" (corresponding to identity) of the tag is digitally displayed. Thus, the electronically generated "speed" (i.e., Doppler shift) is the unique, identifying characteristic of the tag.

Figure 2:
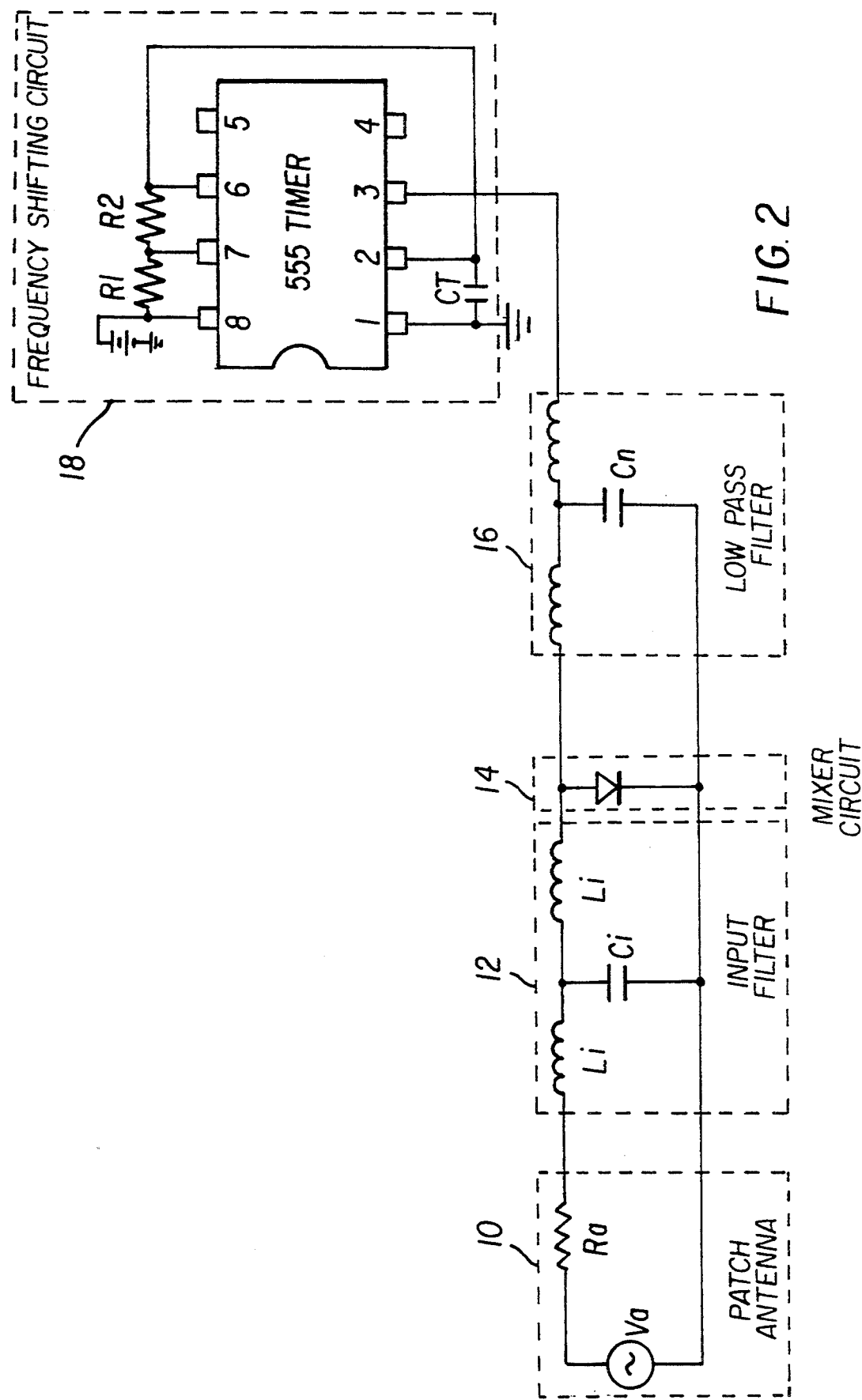
FIG. 2 is a circuit diagram of a preferred embodiment of an active tag in accordance with the invention.

Referring now to FIG. 2, a schematic diagram of a preferred active tag circuit is shown. The circuit preferably includes a 35 GHz patch antenna 10, an input filter 12, a RF mixer circuit 14 (diode), a low-pass filter 16, and a frequency shifting circuit 18, which in the illustrated embodiment includes a timer chip coupled to a battery. The patch antenna 10 and input filter 12 are preferably of the type disclosed in U.S. Pat. No. 5,068,669 and 5,218,374.

In operation, the patch antenna 10 receives an interrogation signal from a conventional radar gun. The signal propagates through the input filter 12, which is also used to match the impedance of the antenna 10 to the rest of the circuit, and is eventually reflected back from the low-pass filter 16 and out the patch antenna 10. The low-pass filter 16 only allows low frequency pulses from the timer chip (on the order of 9-11 KHz) to pass. The low frequency pulses are then mixed with the 35 GHz interrogation signal received from the radar gun by the RF mixer circuit 14. As will be readily understood by those of ordinary skill in the art, when two signals of frequencies f1 and f2 are input into a square law detector, such as the illustrated diode of the RF mixer circuit 14, the resultant signal will be mixed to the frequencies $f1-f2$ and $f1+f2$, as well as higher order harmonics. The mixed signal then propagates/reflects back out of the patch antenna 10. The radar gun detects the returning signals, but is designed to respond to only the higher velocity signal ($f1+f2$), and displays a corresponding "speed" associated with the frequency shift that uniquely identifies the tag.

Figure 3:
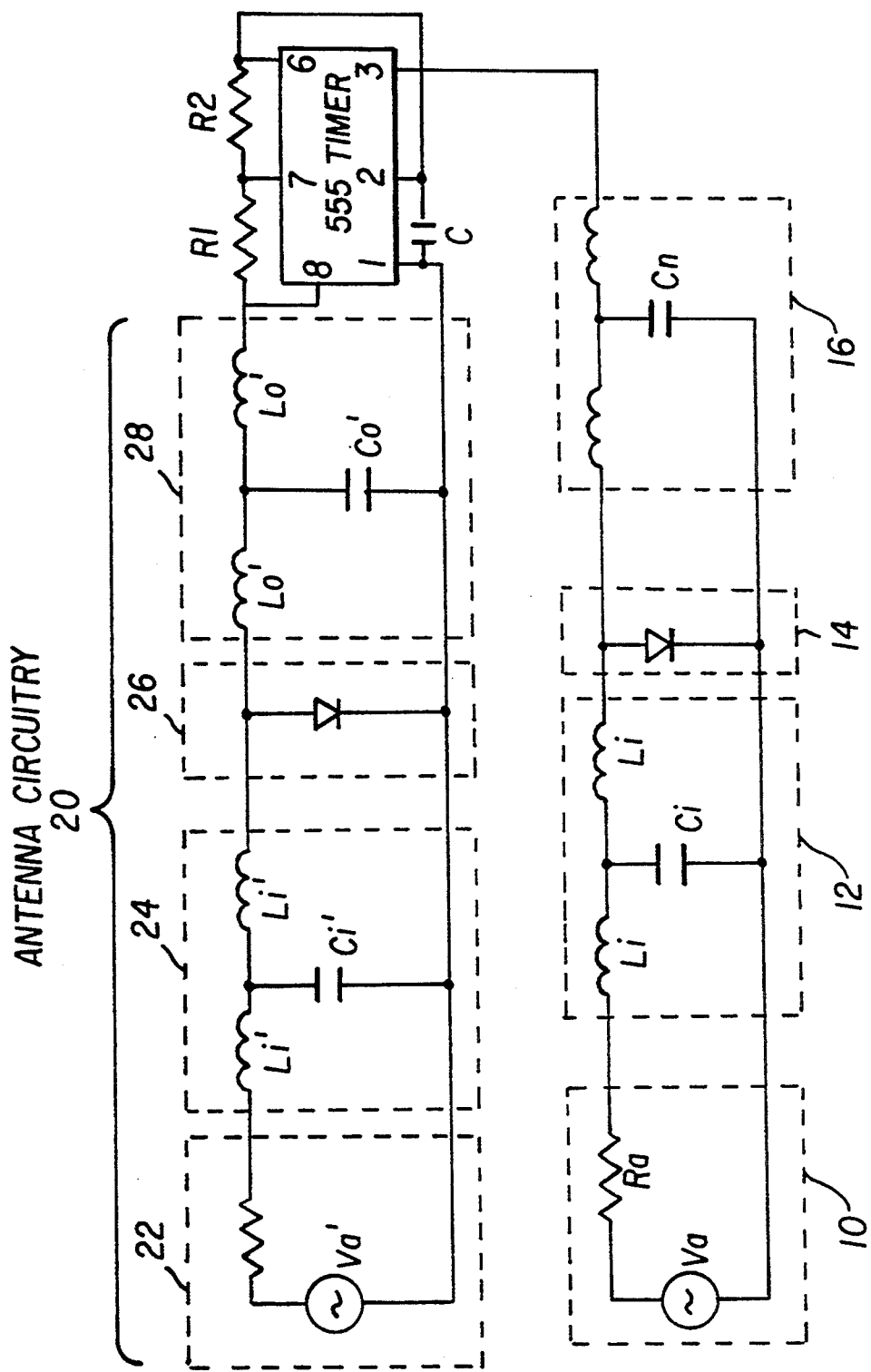
FIG. 3 is a circuit diagram of a preferred embodiment of a passive tag in accordance with the invention.

FIG. 3 is a circuit diagram for a passive tag that is similar to the active tag circuit. The major difference is the inclusion of rectenna circuitry 20 (of the type disclosed in U.S. Pat. Nos. 5,068,669 and 5,218,374) which replaces the battery in the frequency shifting circuit 18 and supplies a small amount of power to the timer chip. The rectenna circuitry 20 includes its own patch antenna 22, input filter 24, rectifying diode 26 and output filter 28. In this case, two patch antennas are employed, but the overall size of the system is actually smaller than the active system shown in FIG. 2, as the battery required in the active system requires more space than the rectenna circuitry 20.

Figure 4:
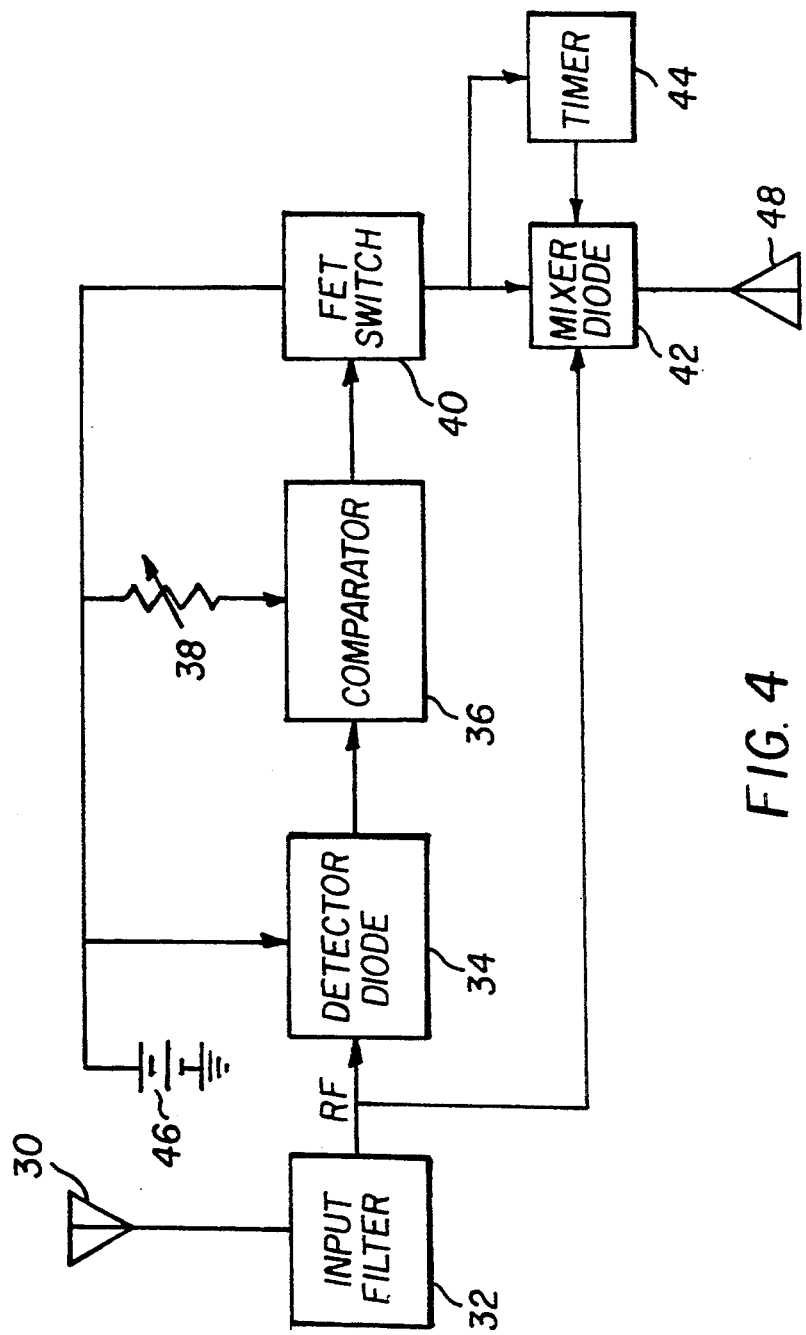
FIG. 4 is a schematic block diagram of a preferred embodiment of a semi-passive tag in accordance with the invention.

FIG. 4 illustrates a semi-passive tag that is a cross between the active and passive tags described above. The semi-passive tag includes an input patch antenna 30 coupled to an input filter and matching circuit 32, a detector diode 34 coupled to the output of the input filter and matching circuit 32, a comparator 36 having a first input coupled to the output of the detector diode 34 and a second input coupled to a variable resistor 38, an FET switch 40 controlled by the output of the comparator 36, a mixer diode 42 and frequency shifting circuit (timer) 44 coupled to the output of the FET switch 40, and a battery 46 coupled to the detector diode 34, the variable resistor 38 and an FET switch 40. In operation, the battery 46 supplies a "trickle current" to the detector diode 34 and the comparator 36 (preferably a CMOS device). The comparator 36 compares the signal from the detector diode 34 with a low level DC voltage (10 $\mu$V) set with variable resistor 38. When an interrogation signal is received, the output from the detector diode 34 will cause the comparator 36 to trigger, thereby supplying a signal to the FET switch 40 which causes the FET switch 40 to close and supply power to the mixer diode 42 and the frequency shifting circuit 44. The tag then operates as an active device as described above, and transmits a frequency shifted signal via an output patch antenna 48. When the interrogation signal is not present, the FET switch 40 opens and cuts power to the mixer diode 42 and frequency shifting circuit 44, thereby limiting the current drain from the battery 46. The semi-passive tag has the advantages of the active tag (improved range), while limiting the disadvantages associated with utilizing an active power source (limited operating time).

While the preferred embodiments are based on an operating frequency of about 35 GHz (or frequencies preferably within the X, $K_u$ and $K_a$ bands), the principle of generating an "electronically" Doppler-shifted signal is applicable to all RF, microwave, millimeter and optical frequency tags, and it will be understood that the invention is not limited to the specifically disclosed frequency of 35 GHz. The major advantage of using the 35 GHz frequency, however, is that both the transmitter and receiver are the same unit, i.e. a police/sport radar gun, which are already mass produced. Thus, a significant system cost savings can be realized. As mentioned earlier, operating at mm-wave frequencies, and in particular at 35 GHz, allows for significant reduction in dimensions of the tag to less than the size of a quarter and most preferably less than a diameter of 5 mm, thereby enabling the tag to be easily concealed.

The tag system of the invention can be utilized in a number of applications heretofore not possible because of previous size, range and cost limitations of previous systems. As a specific example, the tagging system can be used to alert law enforcement officials or store owners of individuals carrying a concealed weapon. In such a case, a tag would be imbedded in the handles (or some other location) of guns by manufacturers. A small unobtrusive police/sport radar guns would then be positioned at the entrance to shops, banks, gas stations, hotel, court rooms, etc., to monitor incoming personnel. Concealed weapons containing the tag would be detected by the radar gun. At that point, the system would be further engineered to meet the specific needs of the particular application. For example, once a tagged weapon had been detected, the system could respond by locking the door, thus keeping the intended criminal outside the establishment. Additional alarms, and/or alerts to the police could also be employed. This system would also have applicability to police on routine patrol. Identification of those individuals who would be carrying a concealed weapon (tagged), could be easily accomplished by a police officer, by simply remotely probing the individual with a standard police radar gun. As mentioned before, ranges could be upwards of 100 meters, or about the length of a football field.

Another very important application of tag system is for the transmission of road-side information. While the system proposed above operates using a Doppler shift in the frequency spectrum, it is also possible to have the tag generate a frequency modulated signal, such that the tag operates as a very local FM transmitter. Tags programmed to have various road-side information, such as rest stops, food, lodging, gas, etc. would then be placed along the highway. A passing vehicle would include a transmitter that sends out an interrogation signal. The tag would respond to the interrogation signal by transmitting the road-side information as a simple frequency modulated signal that would be detected by the vehicle's FM radio. Similarly, this information could also be conveyed using Doppler shifting as described above, wherein each "speed" would be coded to a corresponding service, but this would require that the vehicle have a receiver separate from a standard FM radio. The system described above has advantageous over conventional information systems that utilize central transmitters, namely, the tags themselves act as an inexpensive network of local (and stand alone) FM transmitters.

The invention has been described with reference to certain preferred embodiments. It will be understood, however, that modifications and variations are possible within the scope of the appended claims. For example, the invention is not limited to the use of frequency shifting to convey identification or other information, rather conventional coding systems can also be employed in the high frequency miniaturized tags of the invention.

What is claimed is:

1. A tagging system comprising:
   receiving means for receiving an interrogation signal; frequency shifting means for generating a frequency shifted signal in response to the receipt of the interrogation signal by the receiving means; and transmission means for transmitting the frequency shifted signal;
   wherein the frequency shifting means further comprises a passive power source coupled to the timer circuit; and
   wherein the passive power source comprises a rectenna circuit including a patch antenna coupled to an input filter, a rectifying diode coupled to an output of the input filter, and an output filter coupled to the rectifying diode.

2. A tagging system as claimed in claim 1, wherein the interrogation signal has a frequency greater than 10 GHz.

3. A tagging system as claimed in claim 1, wherein the interrogation signal has a frequency in the $K_a$ band.

4. A tagging system as claimed in claim 1, wherein the frequency shifting means comprises a timer circuit.

5. An identification/security tagging system comprising:
   base transmission means for transmitting an interrogation signal;
   at least one tag comprising a receiving means for receiving the interrogation signal, frequency shifting means for generating a frequency shifted signal in response to the receipt of the interrogation signal by the receiving means, and transmission means for transmitting the frequency shifted signal; and
   base receiving means for receiving the frequency shifted signal transmitted by the transmission means of the tag, wherein the base receiving means includes means for identifying the tag based on the amount of electronic Doppler shift between the interrogation signal and the frequency shifted signal.

6. A tagging system as claimed in claim 5, wherein the interrogation signal transmitted by the base transmission means has a frequency greater than 10 GHz.

7. A tagging system as claimed in claim 5, wherein the interrogation signal transmitted by the base transmission means has a frequency in the $K_a$ band.

8. A tagging system as claimed in claim 5, wherein the frequency shifting means comprises a timer circuit.

9. A tagging system as claimed in claim 8, wherein the frequency shifting means includes an active power source coupled to the timer circuit.

10. A tagging system as claimed in claim 5, wherein the frequency shifting means includes a passive power source coupled to the timer circuit.

11. An identification/security tagging system comprising:
   base transmission means for transmitting an interrogation signal;
   at least one tag comprising a receiving means for receiving the interrogation signal, frequency shifting means for generating a frequency shifted signal in response to the receipt of the interrogation signal by the receiving means, and transmission means for transmitting the frequency shifted signal; and
   base receiving means for receiving the frequency shifted signal transmitted by the transmission means of the tag, wherein the base receiving means includes means for decoding the frequency shifted signal to identify the tag; wherein the frequency shifting means includes a passive power source coupled to a timer circuit; and wherein the passive power source comprises a rectenna structure.

12. A tagging system comprising:
   a transmitter for transmitting a microwave interrogation signal;
   at least one tag that generates an information signal in response to receipt of the microwave interrogation signal; and
   a receiver for receiving the information signal generated by the tag;
   wherein the tag includes a passive power supply comprising a rectenna structure.

13. A tagging system as claimed in claim 11, wherein the interrogation signal transmitted by the base transmission means has a frequency greater than 10 GHz.

14. A tagging system as claimed in claim 11, wherein the interrogation signal transmitted by the base transmission means has a frequency in the $K_a$ band.

* * * * *